March 29, 1938. O. HINTZ 2,112,491
GAUGE FOR SETTING INTERNALLY THREADED BLANKS IN A THREAD GRINDING MACHINE
Filed Jan. 4, 1937
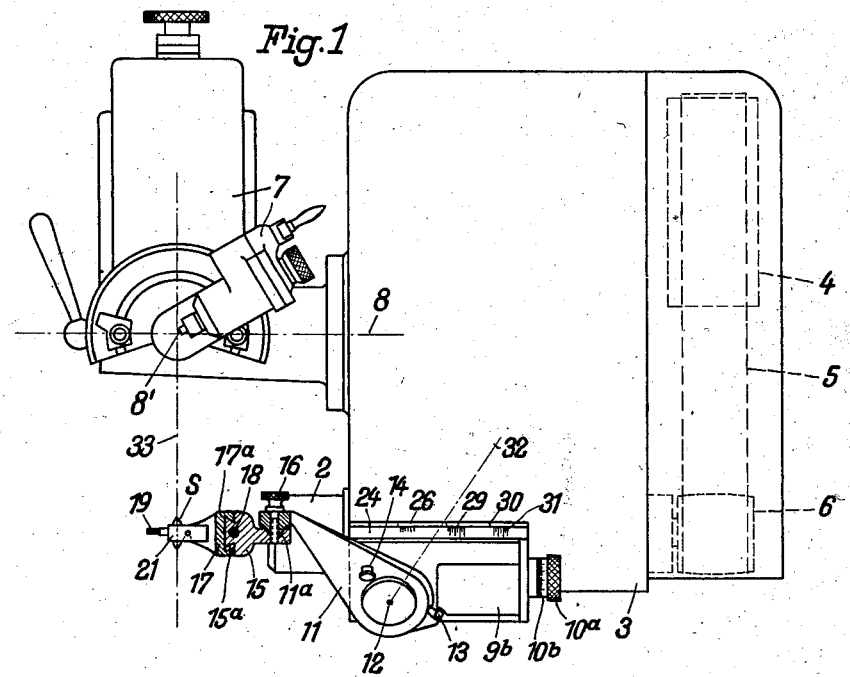
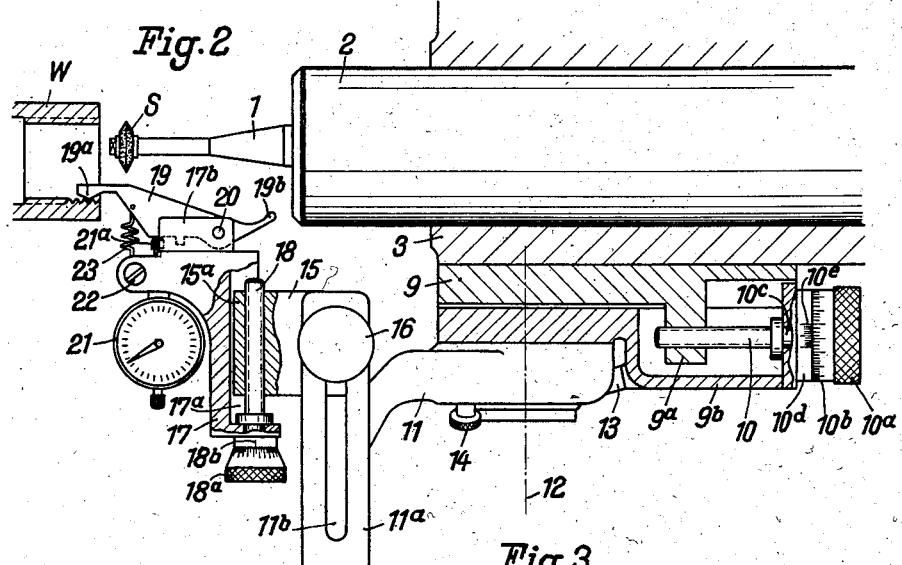
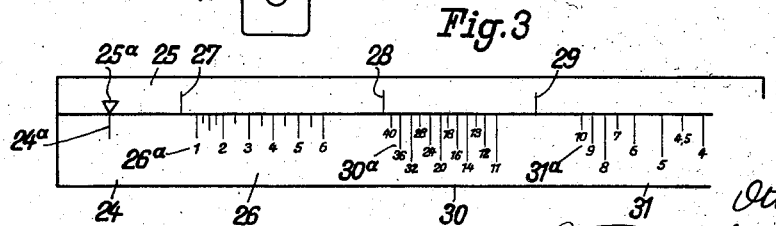
Inventor:
Otto Hintz,
By Frank A. [illegible]
attorney.

Patented Mar. 29, 1938

2,112,491

UNITED STATES PATENT OFFICE 2,112,491

GAUGE FOR SETTING INTERNALLY THREADED BLANKS IN A THREAD GRINDING MACHINE

Otto Hintz, Frohnau, near Berlin, Germany, assignor to Herbert Lindner, Berlin-Wittenau, Germany Application January 4, 1937, Serial No. 119,037
In Germany July 16, 1936

6 Claims. (Cl. 33—172)

This invention relates to a gauge for setting internally threaded blanks in a thread grinding machine.

Heretofore, means have been provided for setting externally threaded blanks in thread grinding machines, but such means requires the use of a complicated arrangement and also requires several operations. The method generally used requires that a thread gauge be inserted between the centers of the grinding machine, and a positioning gauge, which is mounted on the machine to swing toward and from the axis of the blank, is brought into contact with the pre-formed thread on the blank and is adjusted longitudinally to fit in the groove of the thread. This gauge is definitely positioned with respect to the grinding wheel in such manner that the distance longitudinally of the axis of the grinding wheel between the edge of the wheel and the center of the gauge is a multiple of the pitch of the screw to be ground. After this setting of the positioning gauge relative to the thread gauge, the positioning gauge is swung away from the thread gauge and the latter is removed. The blank is now fixed in the machine and the positioning gauge swung into contact with the blank which is then adjusted so that the gauge point enters the thread groove to the greatest possible extent. The positioning gauge is now swung away from the work and the grinding wheel brought into contact therewith. While this very complicated arrangement may be used for blanks with external threads, it cannot be used for blanks having pre-formed internal threads because one cannot tell with accuracy by direct vision what the position of a gauge point is in a hollow object, nor can the gauge be swung out of the way if used in such an object.

One important object of the present invention is to provide a novel general construction of setting gauge for positioning internally threaded blanks in a thread grinding machine.

A second important object of the invention is to provide novel means in such a gauge arrangement for accurately determining the proper positioning of the gauge point in the blank.

A third important object of the invention is to provide a novel arrangement whereby the gauge point may be set in desired relation to the cutting plane of the milling cutter.

With the foregoing and other objects in view, the invention consists in the details of construction and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a side elevation of a portion of a thread milling machine having the novel gauge means applied thereto, the latter being shown partly in section;

Figure 2 illustrates an enlarged plan view, partly in section, and showing a portion of a grinding machine head with the invention applied; and Figure 3 illustrates a greatly enlarged face view of a scale arrangement used herewith.

While the invention may be applied to any convenient part of a grinding machine, it is here shown as carried by the head 3. Arranged in the head 3 is a sleeve 2 in which is journalled in the usual manner a grinding spindle 1 provided with a pulley 6. The pulley 6 is connected by a belt 5 with a pulley 4, which may be driven by any suitable means such as a motor (not shown). The spindle 1 carries the grinding wheel S which has its profile shaped in accordance with the profile of the thread to be ground. As here shown, the wheel S is profiled for grinding a V-thread, but the invention is not limited to any particular form of thread and the form here given the grinding wheel is merely indicative of some form of thread grinding wheel. In order to dress the grinding wheel so that its profile center plane 33 will be accurately positioned relative to the head 3, a dressing device 7 is mounted on the head to swing on the axis 8. This device is provided with the usual diamond point 8' adjustable to desired position for dressing the wheel S.

All of the foregoing parts are common in thread grinding machines so that more detailed disclosure of these parts is not necessary, since they are all old and well known.

The invention itself consists of a base member 9 which is fixed on the head 3 and is provided with an arm 9a. On this base member is slidably mounted a carriage 9b in the rear end of which is journalled the smoothly cylindrical portion 10c of a screw 10 which is screwed through the arm 9a. The screw 10 is provided with a knurled head 10a which carries a cylindrical scale 10b. On the carriage 9b is a cylindrical boss 10d against which the scale 10b rests so that rotation of the screw 10 causes this scale to move past a vernier scale 10e formed on the boss. Thus, the carriage 9b may be micrometrically adjusted on the base 9. An arm 11 is pivoted at one end to the carriage 9b by a pivot 12 and a stop 13 is provided on the carriage so that, in inactive position, the arm 11 may rest against this stop. In its active position, which is about 90° from its inactive position in an anti-clockwise direction, the arm is held in set position by an index pin 14 carried by the arm and entering a suitable socket (not shown) in the carriage 9b. Carried by the arm 11 is a guide member 11a which is provided with a longitudinal slot 11b. The lower side of this guide 11a is V-shaped in cross section and on this lower side is held a carrier member 15 having a correspondingly shaped groove. A screw 16 passes through the slot 11b and holds the carrier to the arm 11 in any desired position of adjustment. The adjustment of the carrier 15 may be termed a coarse adjustment, since it is effected by moving the carrier manually on the guide.

On the forward face of the carrier 15 is formed a dovetail rib 15a which fits in a correspondingly shaped groove 17a formed in a cross carriage 17. On the inner face of this cross carriage 17 is a pair of ears 17b between which fits a gauge lever 19, the lever being mounted on a pivot pin 20 carried by said ears. A micrometer screw 18 is journalled in the outer end of the cross carriage 17 and is screwed through the carrier 15. This screw 18 is provided with a knurled and circumferentially graduated head 18a, an index mark 18b being provided for the graduations on the cross carriage 17. By means of the screw 18, a fine or micrometric cross adjustment of the cross carrier, and consequently of the gauge lever 19, may be obtained. The lever 19 is provided at its forward end with a V-shaped gauge point 19a and at its rear end with a finger piece 19b which may be pressed outwardly to swing the gauge point inwardly. The V-shaped gauge point has its sides arranged at a blunt angle so that the angle between the sides is greater than that between the sides of the thread groove, for purposes presently to be explained. On the inner face of the cross carriage 17 is a stop 21a against which the forward arm of the lever 19 is normally held by a tension spring 23 which has one end connected to the lever 19 and its other end held by a screw 22 carried by the cross carriage 17. This stop 21a forms the stem of a feeler dial 21 of ordinary construction, the dial being supported from the cross carriage 17. By this means, minute movements of the point 19a can be readily observed, even though the point itself cannot be seen.

The point 19a of the application has a greater angle than the side angle of the thread groove in the work-piece to prevent notable variations in the set distance from the center of the point to the center of the profile center plane of the grinding disk while a work-piece is being adjusted. The angle of the point 19a is therefore not immediately brought in relation to the normal side angle of the thread groove, since the thread groove when prepared to be worked shows an incorrect side angle. In addition, it is possible that the thread grooves of the different pieces have varying depth. Should, therefore, the point 19a have a steeper angle than the side angle of the thread, it would enter far enough into the thread groove to touch the thread core. This would cause considerable deviation in the above-mentioned relative distance, so that the precise adjustment of the thread to be formed would be problematical. Because of these facts, the angle of the point 19a has been increased over the side angle of the thread groove. This gives a greater measure of accuracy in the setting of a number of workpieces at the same time, and the setting is made easier since the angled point 19a touches only on the edges of the grooves.

Carried by the main or longitudinal carriage 9b is a scale plate 24 which moves past a scale plate 25 on the base 9. On these scale plates are cooperating index marks which are so positioned that when opposite each other, the point 19a will be positioned in the center plane of the grinding wheel profile. In order that calculations of the required spacing of the point 19a forwardly of the center plane of the wheel S may be avoided, the scale plate 24 is provided with a scale 26 for threads of millimetric pitch and with scales 30 and 31 for threads wherein the pitch is measured in the ordinary units, for instance, inches. On the plate 25 are index lines 27, 28 and 29 cooperating with these scales. It will be noted that these scales have respective scale indicia 26a, 30a and 31a, indicating the number of threads per unit of measurement. The arrangement of the scales is such that when it is desired to set the device for a particular pitch of thread it is merely necessary to bring the scale line corresponding to the number of threads per unit of measurement in alinement with the corresponding index mark by rotating the head 18a. When this is done, the point 19a will have been displaced forwardly of the center plane of wheel S a distance equal with great exactness to a multiple of the thread pitch.

In operation, the blank W is placed in the usual chuck (not shown). The arm 11 is brought to active position by swinging in an anti-clockwise direction and the carrier 15 is manually adjusted towards the wheel S and locked in adjusted position with the point 19a in position to enter the hollow blank. The longitudinal carriage is now moved to displace the point 19a forwardly from the center plane of the wheel S. This may be done either by alining the marks 24a and 25a and then rotating the head 18a until the graduations thereon indicate that the point 19a has been moved forwardly a distance obtained by calculation, or from tables, or by alining the proper pitch mark and index line as above explained. The head 18a is now rotated to bring the point 19a into engagement with the preformed threads of the blank. Now, by adjusting the blank along its axial line, a location will be found at which the feeler dial indicates the maximum outward movement of the point 19a. At this position of the blank, the thread groove vertically below the prolonged axis of the wheel S and engaged by the point 19a will be a multiple of the thread pitch forward of the center plane of the wheel S. The finger piece 19b is now pressed, the lever 19 drawn out of the hollow blank and the gauge restored to inoperative position along the line 32. The machine clutch is locked in this adjusted position and the machine started and operated in the usual manner.

There has thus been provided a simple and efficient device of the kind described and for the purpose specified.

It is obvious that changes may be made in the form and construction of the invention without departing from the material principles involved. It is not therefore desired to confine the invention to the exact form herein shown and described, but it is desired to include all forms which come within the scope of the appended claims.

I claim:

1. In a gauge for positioning internally threaded blanks in a thread grinding machine having a grinding head supporting a grinding wheel profiled to form a thread groove, a base adapted for attachment to said head to extend parallel to the axis of the grinding wheel, a main carriage slidable longitudinally of said base, means to adjust said carriage on said base, an arm pivoted to said carriage to swing between operative and inoperative positions, a carrier extending transversely of said carriage and slidably adjustable along said arm, means to secure said carrier in adjusted position on the arm, a cross carriage slidably mounted on said carrier, means to adjust said carriage on said carrier, and a gauge point carried by said cross carriage.

2. In a gauge for positioning internally threaded blanks in a thread grinding machine having a grinding head supporting a grinding wheel profiled to form a thread groove, a base adapted for attachment to said head to extend parallel to the axis of the grinding wheel, a main carriage slidable longitudinally of said base, means to adjust said carriage on said base, an arm pivoted to said carriage to swing between operative and inoperative positions, a carrier extending transversely of said carriage and slidably adjustable along said arm, means to secure said carrier in adjusted position on the arm, a cross carriage slidably mounted on said carrier, means to adjust said carriage on said carrier, a gauge point carried by said cross carriage, a gauge lever providing a mount for said gauge point at one end and pivoted to said cross carriage, and spring means urging said lever to tilt in one direction.

3. In a gauge for positioning internally threaded blanks in a thread grinding machine having a grinding head supporting a grinding wheel profiled to form a thread groove, a base adapted for attachment to said head to extend parallel to the axis of the grinding wheel, a main carriage slidable longitudinally of said base, means to adjust said carriage on said base, an arm pivoted to said carriage to swing between operative and inoperative positions, a carrier extending transversely of said carriage and slidably adjustable along said arm, means to secure said carrier in adjusted position on the arm, a cross carriage slidably mounted on said carrier, means to adjust said carriage on said carrier, a gauge point carried by said cross carriage, a gauge lever providing a mount for said gauge point at one end and pivoted to said cross carriage, spring means urging said lever to tilt in one direction, and a feeler dial supported by said cross carriage and engaging said lever to indicate the extent of the tilting movement of the lever.

4. In a gauge for positioning internally threaded blanks in a thread grinding machine having a grinding head supporting a grinding wheel profiled to form a thread groove, a base adapted for attachment to said head to extend parallel to the axis of the grinding wheel, a main carriage slidable longitudinally of said base, means to adjust said carriage on said base, an arm pivoted to said carriage to swing between operative and inoperative positions, a carrier extending transversely of said carriage and slidably adjustable along said arm, means to secure said carrier in adjusted position on the arm, a cross carriage slidably mounted on said carrier, means to adjust said carriage on said carrier, a gauge point carried by said cross carriage, and means to indicate the extent of movement of the main carriage on the base.

5. In a gauge for positioning internally threaded blanks in a thread grinding machine having a grinding head supporting a grinding wheel profiled to form a thread groove, a base adapted for attachment to said head to extend parallel to the axis of the grinding wheel, a main carriage slidable longitudinally of said base, means to adjust said carriage on said base, an arm pivoted to said carriage to swing between operative and inoperative positions, a carrier extending transversely of said carriage and slidably adjustable along said arm, means to secure said carrier in adjusted position on the arm, a cross carriage slidably mounted on said carrier, means to adjust said carriage on said carrier, a gauge point carried by said cross carriage, and micrometric means to indicate the extent of movement of the main carriage on the base.

6. In a gauge for positioning internally threaded blanks in a thread grinding machine having a grinding head supporting a grinding wheel profiled to form a thread groove, a base adapted for attachment to said head to extend parallel to the axis of the grinding wheel, a main carriage slidable longitudinally of said base, micrometric means to adjust said carriage on said base, an arm pivoted to said carriage to swing between operative and inoperative positions, a carrier extending transversely of said carriage and slidably adjustable along said arm, means to secure said carrier in adjusted position on the arm, a cross carriage slidably mounted on said carrier, micrometric means to adjust said carriage on said carrier, and a gauge point carried by said cross carriage.

OTTO HINTZ.